United States Patent
Selvaraj

(10) Patent No.: US 8,493,681 B1
(45) Date of Patent: Jul. 23, 2013

(54) DISK DRIVE GENERATING MAP OF MARGIN RECTANGLES AROUND DEFECTS

(75) Inventor: Gomez Samvasanthan Selvaraj, Udumalpet (IN)

(73) Assignee: Western Digital Technologies, Inc., Irvine, CA (US)

( * ) Notice: Subject to any disclaimer, the term of this patent is extended or adjusted under 35 U.S.C. 154(b) by 353 days.

(21) Appl. No.: 12/952,697

(22) Filed: Nov. 23, 2010

(51) Int. Cl.
*G11B 5/09* (2006.01)

(52) U.S. Cl.
USPC .............................................. 360/53; 360/48

(58) Field of Classification Search
None
See application file for complete search history.

(56) References Cited

U.S. PATENT DOCUMENTS

| | | | |
|---|---|---|---|
| 5,150,050 A | 9/1992 | Genheimer et al. |
| 5,195,076 A | 3/1993 | Aoki |
| 5,216,655 A | 6/1993 | Hearn et al. |
| 5,280,395 A | 1/1994 | Matsuzaki |
| 5,895,438 A | 4/1999 | Yomtoubian |
| 6,057,926 A | 5/2000 | Horai |
| 6,104,556 A | 8/2000 | Schaenzer |
| 6,151,180 A | 11/2000 | Bang |
| 6,219,814 B1 | 4/2001 | Coker et al. |
| 6,223,303 B1 | 4/2001 | Billings et al. |
| 6,239,931 B1 | 5/2001 | Chung et al. |
| 6,301,679 B1 | 10/2001 | Tan |
| 6,366,081 B1 | 4/2002 | Tan et al. |
| 6,384,999 B1 | 5/2002 | Schibilla |
| 6,405,342 B1 | 6/2002 | Lee |
| 6,496,943 B1 | 12/2002 | Belser et al. |
| 6,504,662 B2 | 1/2003 | Sobey |
| 6,606,211 B1 | 8/2003 | Lim et al. |
| 6,654,904 B1 | 11/2003 | Andoh et al. |
| 6,691,255 B1 | 2/2004 | Rothberg et al. |
| 6,704,153 B1 | 3/2004 | Rothberg et al. |
| 6,731,442 B2 | 5/2004 | Jin et al. |
| 6,850,379 B2 | 2/2005 | Andoh et al. |
| 6,940,669 B2 | 9/2005 | Schaenzer et al. |
| 6,947,232 B2 | 9/2005 | Lim et al. |
| 6,950,967 B1 | 9/2005 | Brunnett et al. |
| 6,985,319 B2 | 1/2006 | Yip et al. |
| 7,047,438 B2 | 5/2006 | Smith et al. |
| 7,072,129 B1 | 7/2006 | Cullen et al. |
| 7,139,145 B1 | 11/2006 | Archibald et al. |
| 7,215,619 B1 | 5/2007 | Van Den Enden |
| 7,248,547 B2 | 7/2007 | Ryu et al. |
| 7,389,588 B2 | 6/2008 | Lau |
| 7,434,019 B2 | 10/2008 | Chia et al. |
| 7,562,270 B2 | 7/2009 | Andoh |
| 7,589,926 B2 | 9/2009 | Richmond et al. |
| 7,626,905 B2 | 12/2009 | Lai et al. |
| 7,656,763 B1 | 2/2010 | Jin et al. |
| 7,839,588 B2 | 11/2010 | Dang et al. |
| 7,957,241 B2 | 6/2011 | Vaes |
| 8,014,094 B1 | 9/2011 | Jin |
| 8,023,215 B1 | 9/2011 | Ghaly et al. |
| 2001/0046196 A1 | 11/2001 | McKernan |
| 2001/0055172 A1 | 12/2001 | Yip et al. |
| 2002/0048112 A1 | 4/2002 | Chu et al. |
| 2002/0191319 A1 | 12/2002 | Liew et al. |
| 2004/0100715 A1 | 5/2004 | Smith et al. |
| 2004/0153949 A1 | 8/2004 | Ro et al. |

(Continued)

*Primary Examiner* — Regina N Holder

(57) ABSTRACT

A disk drive is disclosed comprising a head actuated over a disk comprising a plurality of segments. A cluster of defective segments is identified, and a margin rectangle of segments is defined around each defective segment in the cluster. A margin map representing the margin rectangles is generated. The margin map may comprise start and end segment numbers, or run-length encoding, or any other suitable encoding for identifying consecutive segments that extend across multiple, overlapping margin rectangles.

20 Claims, 5 Drawing Sheets

U.S. PATENT DOCUMENTS

| | | |
|---|---|---|
| 2004/0233805 A1 | 11/2004 | Yoshida et al. |
| 2005/0138464 A1 | 6/2005 | Chong et al. |
| 2005/0180282 A1 | 8/2005 | Ouyang et al. |
| 2006/0056088 A1 | 3/2006 | Kudoh et al. |
| 2006/0126204 A1 | 6/2006 | Taniguchi et al. |
| 2007/0089031 A1 | 4/2007 | Huffman et al. |
| 2007/0183074 A1 | 8/2007 | Smith |
| 2007/0279788 A1 | 12/2007 | Andersen et al. |
| 2008/0239548 A1 | 10/2008 | Paul et al. |
| 2009/0034109 A1 | 2/2009 | Paul et al. |
| 2009/0290463 A1 | 11/2009 | Kuze et al. |
| 2010/0091629 A1 | 4/2010 | Tan et al. |
| 2010/0177428 A1 | 7/2010 | Oberg |
| 2011/0158073 A1 | 6/2011 | Ishihara et al. |

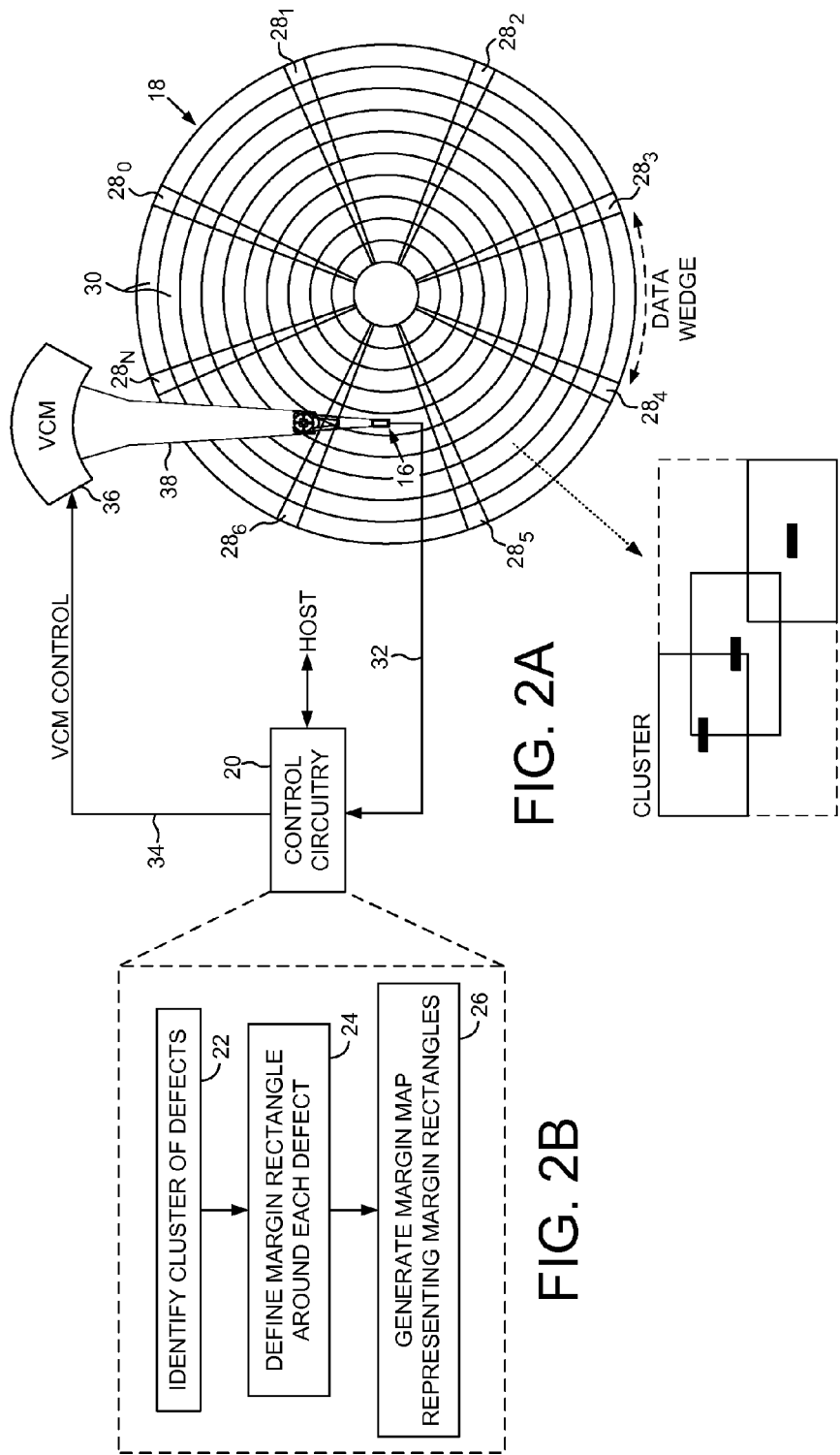

MARGIN MAP

| ENTRY | TRACK | START | END |
|---|---|---|---|
| 1 | i | j | j+4 |
| 2 | i+1 | j | j+4 |
| 3 | i+2 | j | j+4 |
| 4 | i+3 | j | j+4 |
| 5 | i+4 | j | j+7 |
| 6 | i+5 | j | j+7 |
| 7 | i+6 | j | j+7 |
| 8 | i+7 | j | j+7 |
| 9 | i+8 | j | j+7 |
| 10 | i+9 | j | j+11 |
| 11 | i+10 | j | j+11 |
| 12 | i+11 | j+3 | j+11 |
| 13 | i+12 | j+3 | j+11 |
| 14 | i+13 | j+3 | j+11 |
| 15 | i+14 | j+3 | j+11 |
| 16 | i+15 | j+7 | j+11 |
| 17 | i+16 | j+7 | j+11 |
| 18 | i+17 | j+7 | j+11 |
| 19 | i+18 | j+7 | j+11 |
| 20 | i+19 | j+7 | j+11 |

FIG. 3B

MARGIN MAP

| ENTRY | TRACK | START | LENGTH |
|---|---|---|---|
| 1 | i | j | 5 |
| 2 | i+1 | j | 5 |
| 3 | i+2 | j | 5 |
| 4 | i+3 | j | 5 |
| 5 | i+4 | j | 8 |
| 6 | i+5 | j | 8 |
| 7 | i+6 | j | 8 |
| 8 | i+7 | j | 8 |
| 9 | i+8 | j | 8 |
| 10 | i+9 | j | 12 |
| 11 | i+10 | j | 12 |
| 12 | i+11 | j+3 | 9 |
| 13 | i+12 | j+3 | 9 |
| 14 | i+13 | j+3 | 9 |
| 15 | i+14 | j+3 | 9 |
| 16 | i+15 | j+7 | 5 |
| 17 | i+16 | j+7 | 5 |
| 18 | i+17 | j+7 | 5 |
| 19 | i+18 | j+7 | 5 |
| 20 | i+19 | j+7 | 5 |

FIG. 3C

MARGIN MAP

| ENTRY | TRACK | START | END |
|---|---|---|---|
| 1 | i | j | j+4 |
| 2 | i+1 | j | j+4 |
| 3 | i+2 | j | j+4 |
| 4 | i+3 | j | j+4 |
| 5 | i+4 | j | j+4 |
| 6 | i+5 | j | j+4 |
| 7 | i+6 | j | j+4 |
| 8 | i+7 | j | j+4 |
| 9 | i+8 | j | j+4 |
| 10 | i+9 | j | j+4 |
| 11 | i+10 | j | j+4 |

FIG. 4A

MARGIN MAP

| ENTRY | TRACK | START | END |
|---|---|---|---|
| 1 | i | j | j+4 |
| 2 | i+1 | j | j+4 |
| 3 | i+2 | j | j+4 |
| 4 | i+3 | j | j+4 |
| 5 | i+4 | j | j+7 |
| 6 | i+5 | j | j+7 |
| 7 | i+6 | j | j+7 |
| 8 | i+7 | j | j+7 |
| 9 | i+8 | j | j+7 |
| 10 | i+9 | j | j+7 |
| 11 | i+10 | j | j+7 |
| 12 | i+11 | j+3 | j+7 |
| 13 | i+12 | j+3 | j+7 |
| 14 | i+13 | j+3 | j+7 |
| 15 | i+14 | j+3 | j+7 |

DISK DRIVE GENERATING MAP OF MARGIN RECTANGLES AROUND DEFECTS

BACKGROUND

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

FIG. 1 shows a prior art disk format 4 as comprising a number of data tracks 6 defined by servo sectors $2_0$-$2_N$ recorded around the circumference of the disk. Each servo sector $2_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $2_i$ further comprises groups of servo bursts 14, which are recorded with precise intervals and offsets relative to the track centerlines. The servo bursts 14 provide fine head position information used for centerline tracking while accessing a data track during write/read operations.

Each data sector in a data track is typically assigned a physical block address (PBA) which is accessed indirectly through a logical block address (LBA) to facilitate mapping out defective data sectors. A PBA associated with defective data sectors may simply remain unmapped if found during manufacturing. The process of initially mapping out defective PBAs is referred to as "formatting" the disk.

Scanning for defective data sectors during manufacturing of the disk drive typically involves writing a special test pattern (e.g., a 2T pattern) to each data sector (or each data wedge) and reading the test pattern to identify defects. For example, a drop in the amplitude of the read signal may indicate a defect, or a defect filter matched to a defect signature may indicate a defect, or a number of bit errors exceeding a threshold may indicate a defect, etc.

BRIEF DESCRIPTION OF THE DRAWINGS

FIG. 2A shows a disk drive according to an embodiment of the present invention comprising a head actuated over a disk comprising a plurality of segments.

FIG. 2B is a flow diagram according to an embodiment of the present invention wherein a margin map is generated representing margin rectangles.

FIG. 2C shows an embodiment of the present invention wherein a cluster of defective segments on the disk is identified, wherein a margin rectangle of segments is defined around each defective segment.

FIG. 3B shows a margin map according to an embodiment of the present invention wherein each entry represents a track together with a starting and ending segment that may span multiple, overlapping margin rectangles.

FIG. 3C shows a margin map according to an embodiment of the present invention wherein each entry represents a track together with a starting segment and run-length of segments that may span multiple margin rectangles.

FIGS. 4A and 4B illustrate how a margin map is generated by processing each margin rectangle in series and updating at least one of a starting or ending segment of a previous entry when overlapping margin rectangles is detected.

DETAILED DESCRIPTION OF EMBODIMENTS OF THE INVENTION

Figure 1:
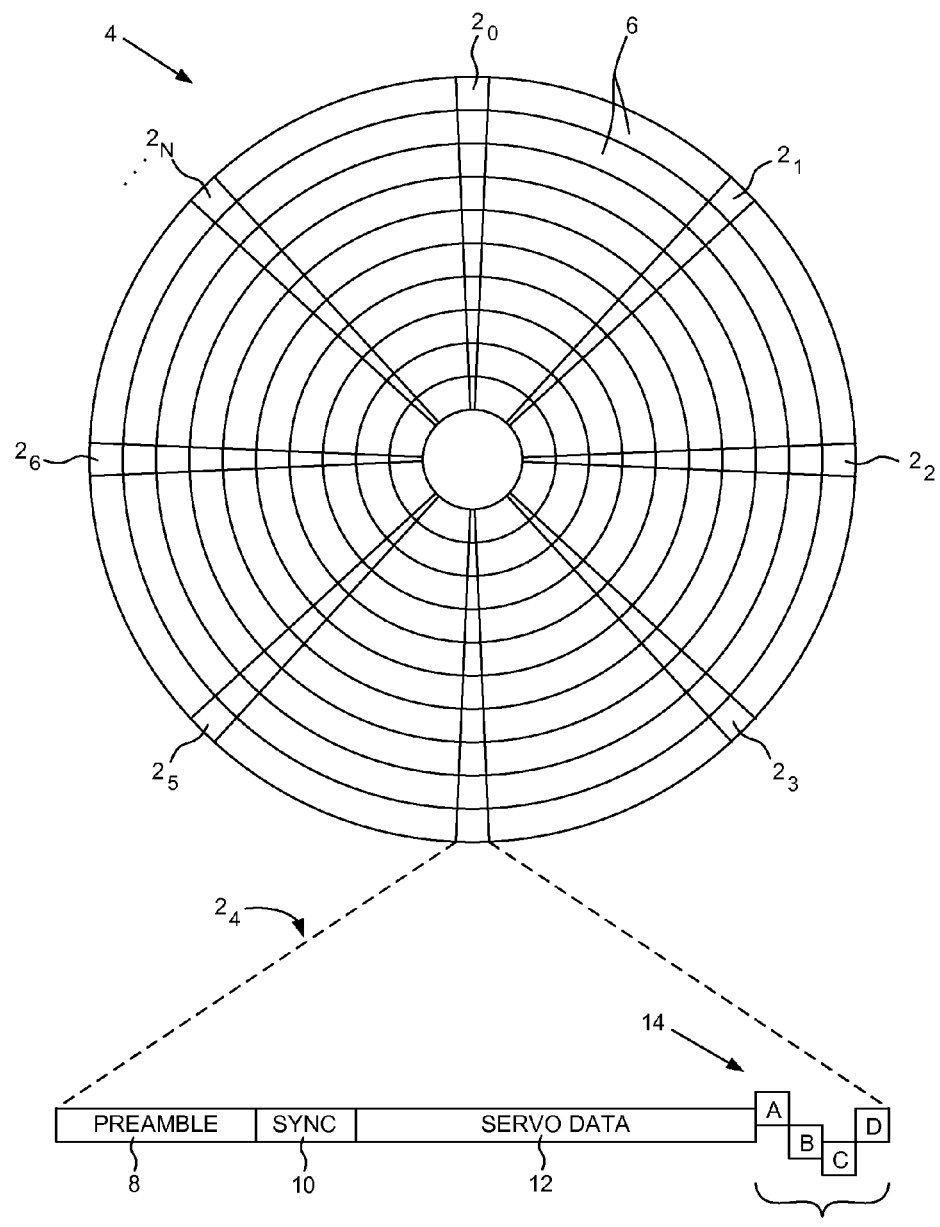
FIG. 1 shows a prior art disk format comprising a plurality of data tracks defined by embedded servo sectors.

FIG. 2A shows a disk drive according to an embodiment of the present invention comprising a head 16 actuated over a disk 18 comprising a plurality of segments. The disk drive further comprises control circuitry 20 operable to execute the flow diagram of FIG. 2B wherein a cluster of defective segments is identified (step 22), and a margin rectangle of segments is defined around each defective segment in the cluster (step 24) (e.g., FIG. 2C). A margin map representing the margin rectangles is generated (step 26).

The disk 18 shown in the embodiment of FIG. 2A comprises a plurality of servo sectors $28_0$-$28_N$ that define a plurality of data tracks 30. The control circuitry 20 processes a read signal 32 emanating from the head 16 to demodulate the servo sectors $28_0$-$28_N$ into a position error signal (PES) representing a position error of the head relative to a target data track. The control circuitry 20 comprises a servo compensator for filtering the PES to generate a control signal 34 applied to a voice coil motor (VCM) 36 that rotates an actuator arm 38 about a pivot in order to actuate the head 16 radially over the disk 18 in a direction that reduces the PES. In one embodiment, each data track 30 comprises a plurality of data sectors that are accessed indirectly through a logical block address (LBA).

The defective segments within a cluster may represent any suitable segment of the disk. In one embodiment, a defective segment may comprise one or more data sectors of a data track. In another embodiment, a defective segment may comprise one or more data wedges, wherein a data wedge comprise the recordable area between consecutive servo sectors as illustrated in FIG. 2A. In yet another embodiment, a defective sector may comprise one or more servo sectors.

The margin rectangles may be defined around each defective segment for any suitable reason. In one embodiment, when a defective segment is detected the margin rectangle defined around the defective segment may identify segments that are also defective and/or suspect. For example, the margin segments of a margin rectangle may be assumed defective and mapped out together with the defective segment, or the margin segments may marked as suspect but still usable. A suspect segment may undergo additional testing after a write operation (write verify) to ensure the integrity of the recorded user data. In another embodiment, the margin map representing the margin rectangles may be used to modify seek operations to ensure a defective segment does not adversely affect the settle time at the end of a seek operation. For example, a rotational position optimization (RPO) algorithm may utilize the margin map to ensure the head reaches a target track well before a defective segment so that the settle operation completes before the head reaches the defective segment.

Defining margin rectangles within a cluster may help increase format efficiency (or seek performance or write performance by avoiding write verifies) as opposed to considering the entire cluster as a marginal region. Referring again to FIG. 2C, the entire cluster rectangle could be considered as a marginal area which would reduce the size and complexity of the margin map; however, the format efficiency (or seek performance or write performance) may also be reduced because the entire cluster rectangle need not be considered as marginal. In order to achieve better format efficiency (or better seek performance or write performance), a margin rectangle is defined around each defective segment within a cluster so that the segments outside the margin rectangles (e.g., as shown in FIG. 2C) may be processed as normal segments.

Figure 3A:
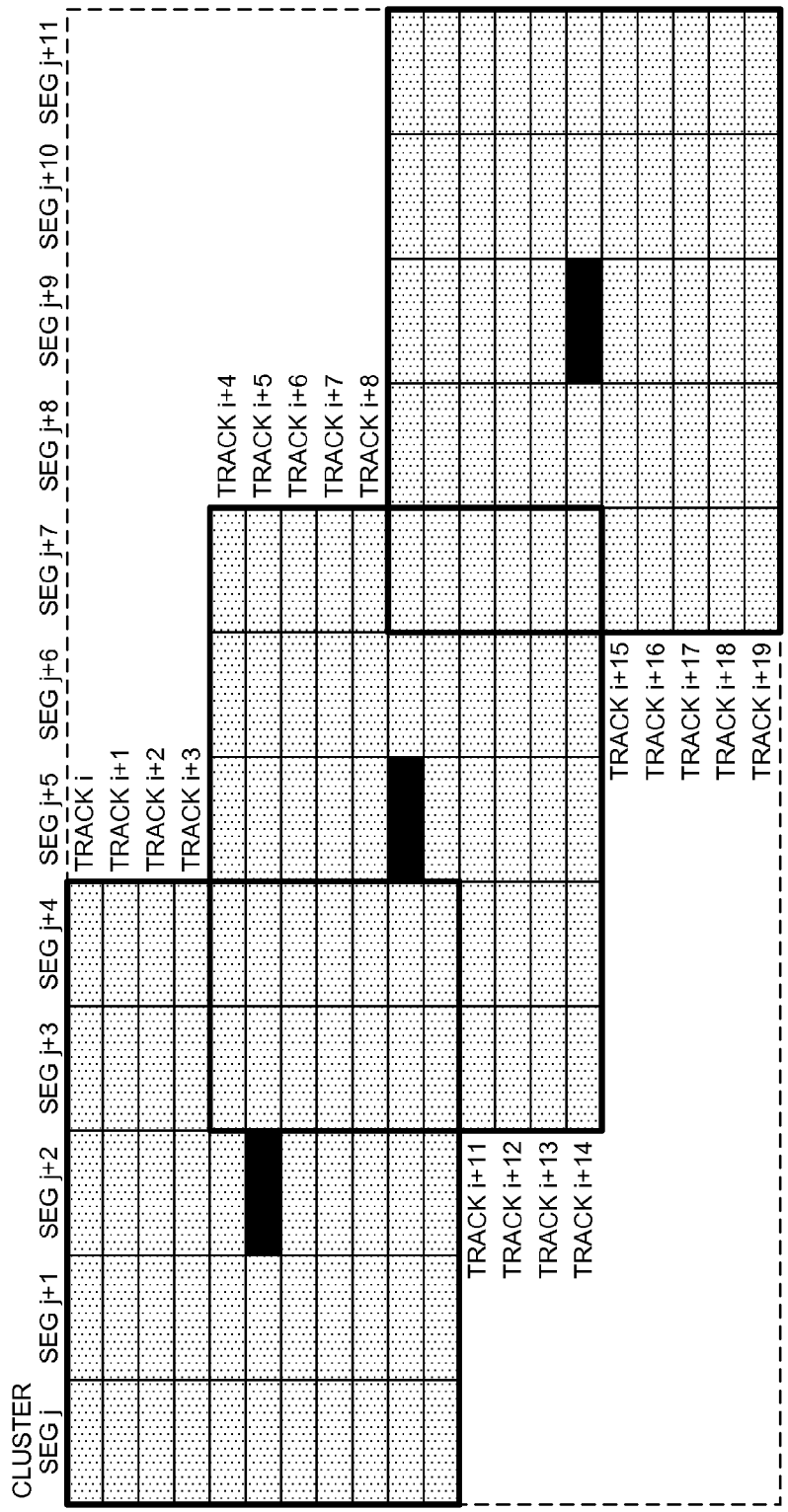
FIG. 3A shows an embodiment of the present invention wherein a cluster may comprise overlapping margin rectangles.

FIG. 3A shows a magnified view of the cluster shown in FIG. 2B including three overlapping margin rectangles defined around three respective defective segments. In the embodiment of FIG. 3A, the cluster rectangle is defined by an upper left corner [track i; segment j] and extending to a lower right corner [track i+19; segment j+11]. The three overlapping margin rectangles within the cluster rectangle are also similarly defined by upper left and lower right corners.

FIG. 3B shows a margin map representing the margin rectangles in the cluster rectangle of FIG. 3A, wherein each entry comprises a track number corresponding to the data tracks spanned by the cluster rectangle, a starting segment number, and an ending segment number. The starting segment number represents the first segment within each data track covered by a margin rectangle, and the ending segment number represents the last segment within each data track covered by a margin rectangle, wherein the starting and ending segment numbers may span multiple overlapping margin rectangles. For example, entry 5 of the margin map of FIG. 3B corresponds to track i+4 in FIG. 3A, wherein the starting segment is j (start of first margin rectangle) and the ending segment is j+7 (end of second margin rectangle). Entry 10 of FIG. 3B spans the three overlapping margin rectangles of FIG. 3A wherein the starting segment is j and the ending segment is j+11. The margin map may be implemented using any suitable encoding, such as a run-length encoding shown in the margin map of FIG. 3B wherein instead of identifying the end segment number, each entry identifies the run-length of segments from the starting segment number.

The margin map of FIG. 3A may be generated in any suitable manner, and in one embodiment, by identifying overlapping entries while processing each margin rectangle of the cluster rectangle. FIG. 4A shows the state of the margin map after processing the first margin rectangle in FIG. 3A, wherein the ending segments are all j+4. FIG. 4B shows the state of the margin map after processing the second margin rectangle of FIG. 3A. When the first data track i+4 of the second margin rectangle is evaluated, the starting segment j+3 overlaps with the first margin rectangle. Therefore entry 5 of FIG. 4B comprises a starting segment of j (starting segment of the first margin rectangle), and an ending segment of j+7 (ending segment of the second margin rectangle). When processing the third margin rectangle, the margin map of FIG. 4B changes to the final state shown in FIG. 3A. The process of identifying overlapping margin rectangles and adjusting the starting and/or ending segments in the corresponding entries of the margin map helps minimize the size of the margin map as well as expedite generating the margin map.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
 a disk comprising a plurality of segments;
 a head actuated radially over the disk; and
 control circuitry operable to:
   identify a cluster of defective segments;
   define a margin rectangle of segments around each defective segment in the cluster; and
   generate a margin map representing the margin rectangles.

2. The disk drive as recited in claim 1, wherein:
 the disk comprises a plurality of data tracks;
 each data track comprises a plurality of data sectors; and
 each segment comprises at least one data sector.

3. The disk drive as recited in claim 1, wherein:
 the disk comprises a plurality of data tracks;
 each data track comprises a plurality of servo sectors; and
 each segment comprises at least one servo sector.

4. The disk drive as recited in claim 1, wherein:
 the disk comprises a plurality of data tracks;
 each data track comprises a plurality of servo sectors; and
 each segment comprises at least one data wedge representing a recording area between each servo sector.

5. The disk drive as recited in claim 1, wherein:
 the disk comprises a plurality of data tracks;
 a first defective segment comprises part of a first data track;
 a first margin rectangle comprises at least one segment in a second data track near the first data track toward an outer diameter of the disk; and
 the first margin rectangle comprises at least one segment in a third data track near the first data track toward an inner diameter of the disk.

6. The disk drive as recited in claim 5, wherein the first margin rectangle comprises at least one segment preceding the first defective segment and at least one segment following the first defective segment.

7. The disk drive as recited in claim 6, wherein the margin map comprises:
 a first entry identifying the first data track;
 a second entry identifying a first segment in the first data track at a start of the first margin rectangle; and
 a third entry identifying a last segment in the first data track at an end of the first margin rectangle.

8. The disk drive as recited in claim 7, wherein the third entry represents a run length from the first segment.

9. The disk drive as recited in claim 6, wherein the margin map comprises:

a first entry identifying the first data track;
a second entry identifying a first segment in the first data track at a start the first margin rectangle; and
a third entry identifying a last segment in the first data track at an end of a second margin rectangle that overlaps the first margin rectangle.

10. The disk drive as recited in claim 9, wherein the margin map comprises:
a fourth entry identifying the second data track;
a fifth entry identifying a first segment in the second data track at a start the first margin rectangle; and
a sixth entry identifying a last segment in the second data track at an end of a third margin rectangle that overlaps the second margin rectangle.

11. A method of operating a disk drive comprising a head actuated over a disk comprising a plurality of segments, the method comprising:
identifying a cluster of defective segments;
defining a margin rectangle of segments around each defective segment in the cluster; and
generating a margin map representing the margin rectangles.

12. The method as recited in claim 11, wherein:
the disk comprises a plurality of data tracks;
each data track comprises a plurality of data sectors; and
each segment comprises at least one data sector.

13. The method as recited in claim 11, wherein:
the disk comprises a plurality of data tracks;
each data track comprises a plurality of servo sectors; and
each segment comprises at least one servo sector.

14. The method as recited in claim 11, wherein:
the disk comprises a plurality of data tracks;
each data track comprises a plurality of servo sectors; and
each segment comprises at least one data wedge representing a recording area between each servo sector.

15. The method as recited in claim 11, wherein:
the disk comprises a plurality of data tracks;
a first defective segment comprises part of a first data track;
a first margin rectangle comprises at least one segment in a second data track near the first data track toward an outer diameter of the disk; and
the first margin rectangle comprises at least one segment in a third data track near the first data track toward an inner diameter of the disk.

16. The method as recited in claim 15, wherein the first margin rectangle comprises at least one segment preceding the first defective segment and at least one segment following the first defective segment.

17. The method as recited in claim 16, wherein the margin map comprises:
a first entry identifying the first data track;
a second entry identifying a first segment in the first data track at a start of the first margin rectangle; and
a third entry identifying a last segment in the first data track at an end of the first margin rectangle.

18. The method as recited in claim 17, wherein the third entry represents a run length from the first segment.

19. The method as recited in claim 16, wherein the margin map comprises:
a first entry identifying the first data track;
a second entry identifying a first segment in the first data track at a start the first margin rectangle; and
a third entry identifying a last segment in the first data track at an end of a second margin rectangle that overlaps the first margin rectangle.

20. The method as recited in claim 19, wherein the margin map comprises:
a fourth entry identifying the second data track;
a fifth entry identifying a first segment in the second data track at a start the first margin rectangle; and
a sixth entry identifying a last segment in the second data track at an end of a third margin rectangle that overlaps the second margin rectangle.

* * * * *